(12) United States Patent
Curtis et al.

(10) Patent No.: US 9,137,178 B2
(45) Date of Patent: Sep. 15, 2015

(54) TRACKING PACKETS THROUGH A CLOUD COMPUTING ENVIRONMENT

(71) Applicant: Verizon Patent and Licensing Inc., Basking Ridge, NJ (US)

(72) Inventors: Paul M. Curtis, Sudbury, MA (US); Marc J. Cochran, Shrewsbury, MA (US); Kevin J. Clarke, Reading, MA (US); Stanislaw Kowalczyk, Boston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 204 days.

(21) Appl. No.: 14/029,106

(22) Filed: Sep. 17, 2013

(65) Prior Publication Data

US 2015/0082077 A1    Mar. 19, 2015

(51) Int. Cl.
*H04L 12/939* (2013.01)
*H04L 12/24* (2006.01)
*H04L 9/06* (2006.01)
*G06F 9/455* (2006.01)
*G06F 11/07* (2006.01)

(52) U.S. Cl.
CPC .......... *H04L 49/557* (2013.01); *H04L 12/2489* (2013.01); *G06F 9/45533* (2013.01); *G06F 11/0793* (2013.01); *H04L 9/0643* (2013.01); *H04L 41/00* (2013.01)

(58) Field of Classification Search
None
See application file for complete search history.

(56) References Cited

U.S. PATENT DOCUMENTS

| 8,230,050 B1* | 7/2012 | Brandwine et al. | 709/220 |
| 8,355,316 B1* | 1/2013 | Lushear et al. | 370/217 |
| 2002/0133575 A1* | 9/2002 | Cidon et al. | 709/220 |
| 2003/0161265 A1* | 8/2003 | Cao et al. | 370/229 |
| 2009/0249473 A1* | 10/2009 | Cohn | 726/15 |
| 2010/0115606 A1* | 5/2010 | Samovskiy et al. | 726/15 |
| 2010/0157788 A1* | 6/2010 | Ellis et al. | 370/216 |
| 2015/0016287 A1* | 1/2015 | Ganichev et al. | 370/252 |

* cited by examiner

*Primary Examiner* — Faruk Hamza
*Assistant Examiner* — Cassandra Decker

(57) ABSTRACT

A device, of a cloud computing environment, receives an instruction to create a virtual packet tracker from a user device associated with a user, and implements the virtual packet tracker in the device based on the instruction. The virtual packet tracker: receives a packet that includes a unique value used to track the packet in a portion of the cloud computing environment associated with the user; provides the packet for routing through the portion; receives an indication that the packet is dropped at a particular resource of the portion; determines whether a problem causing the packet to be dropped can be corrected; and processes the problem based on whether the problem can be corrected. The problem is corrected when it is determined that the problem can be corrected. Information associated with the packet is transmitted to the user device when it is determined that the problem cannot be corrected.

20 Claims, 16 Drawing Sheets

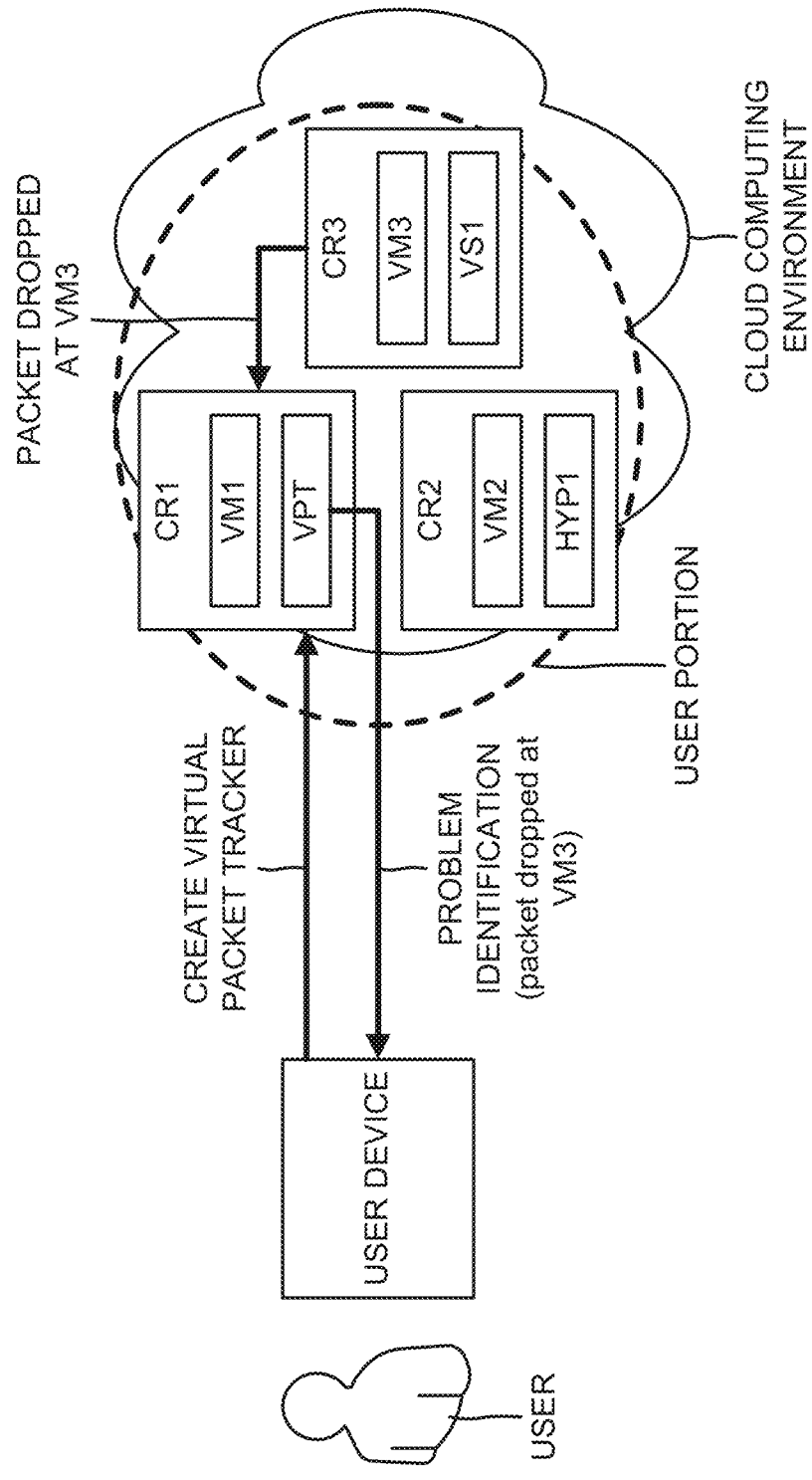

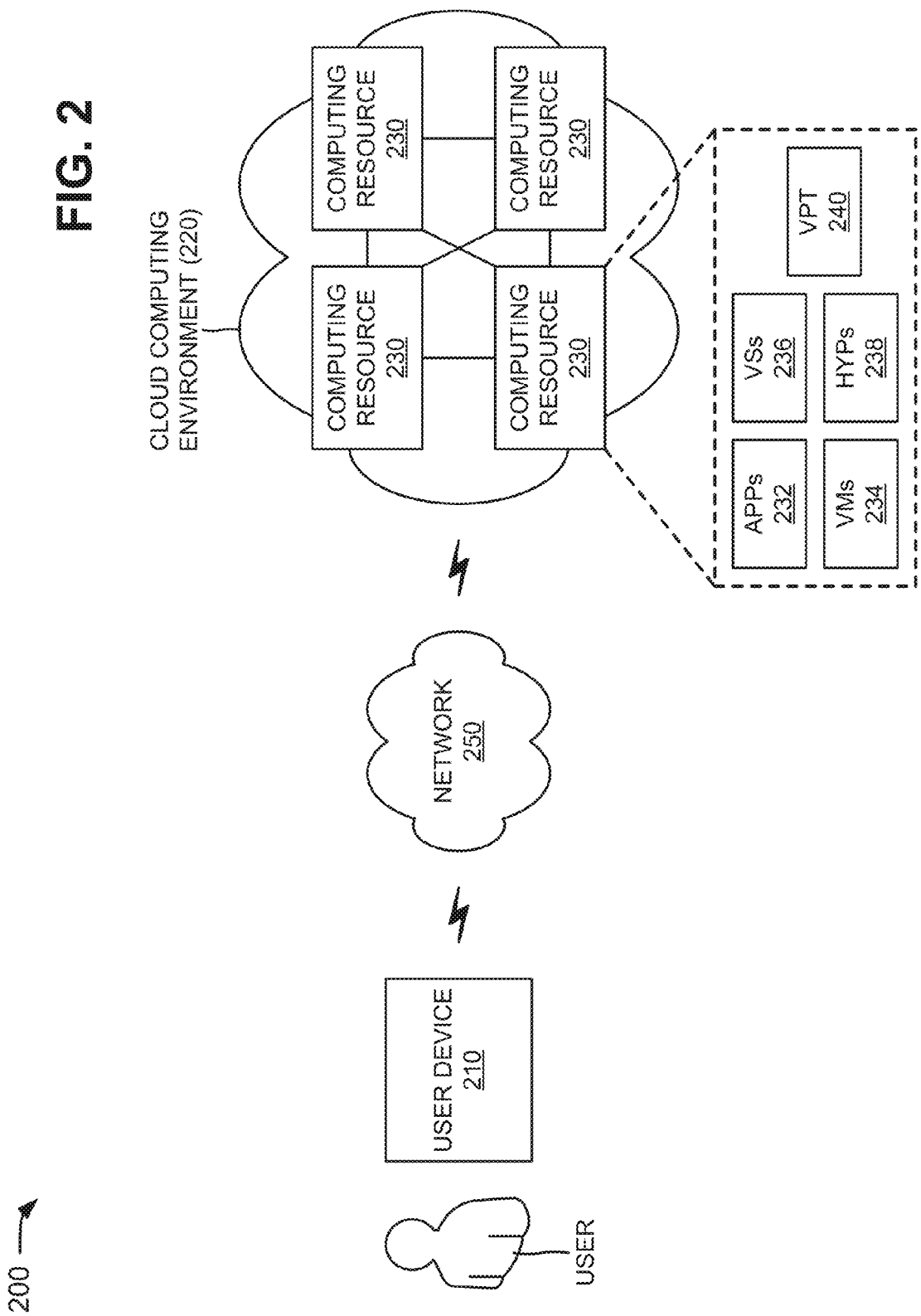

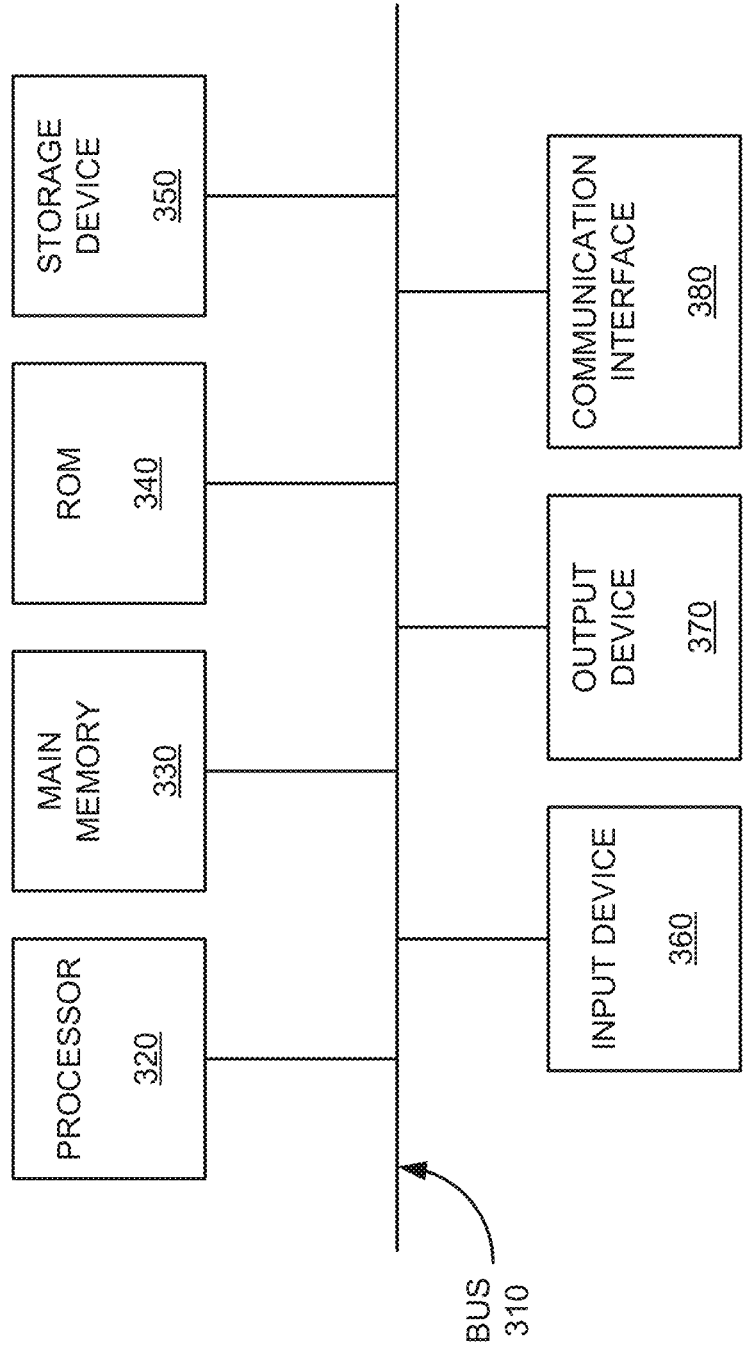

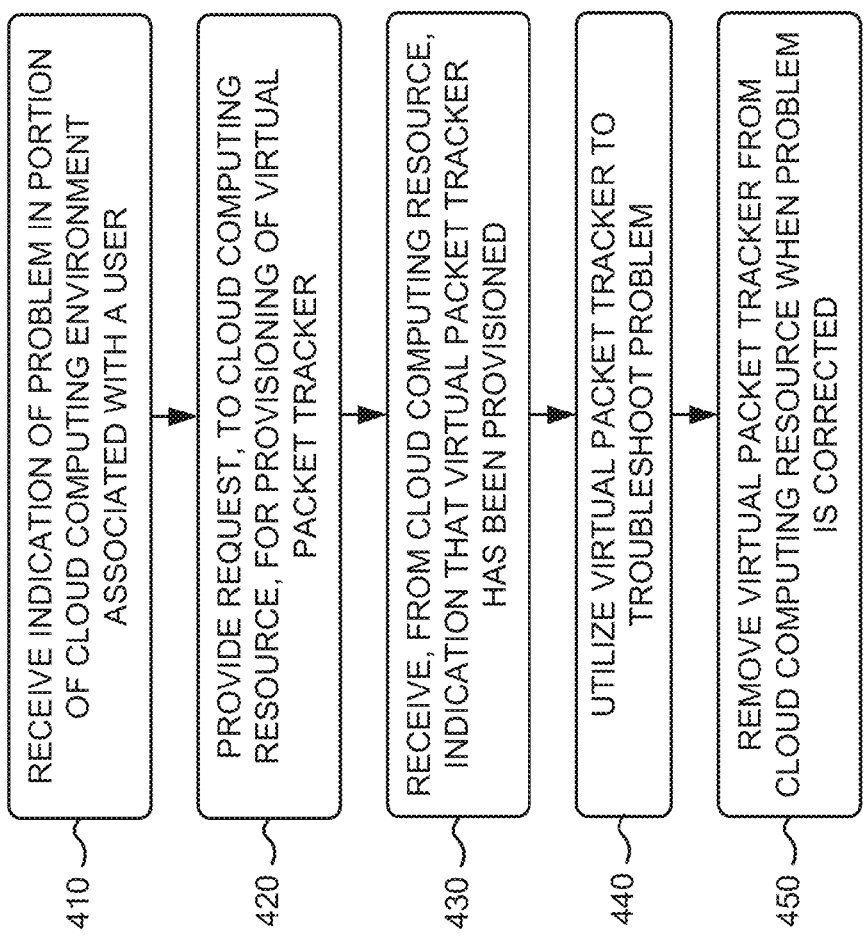

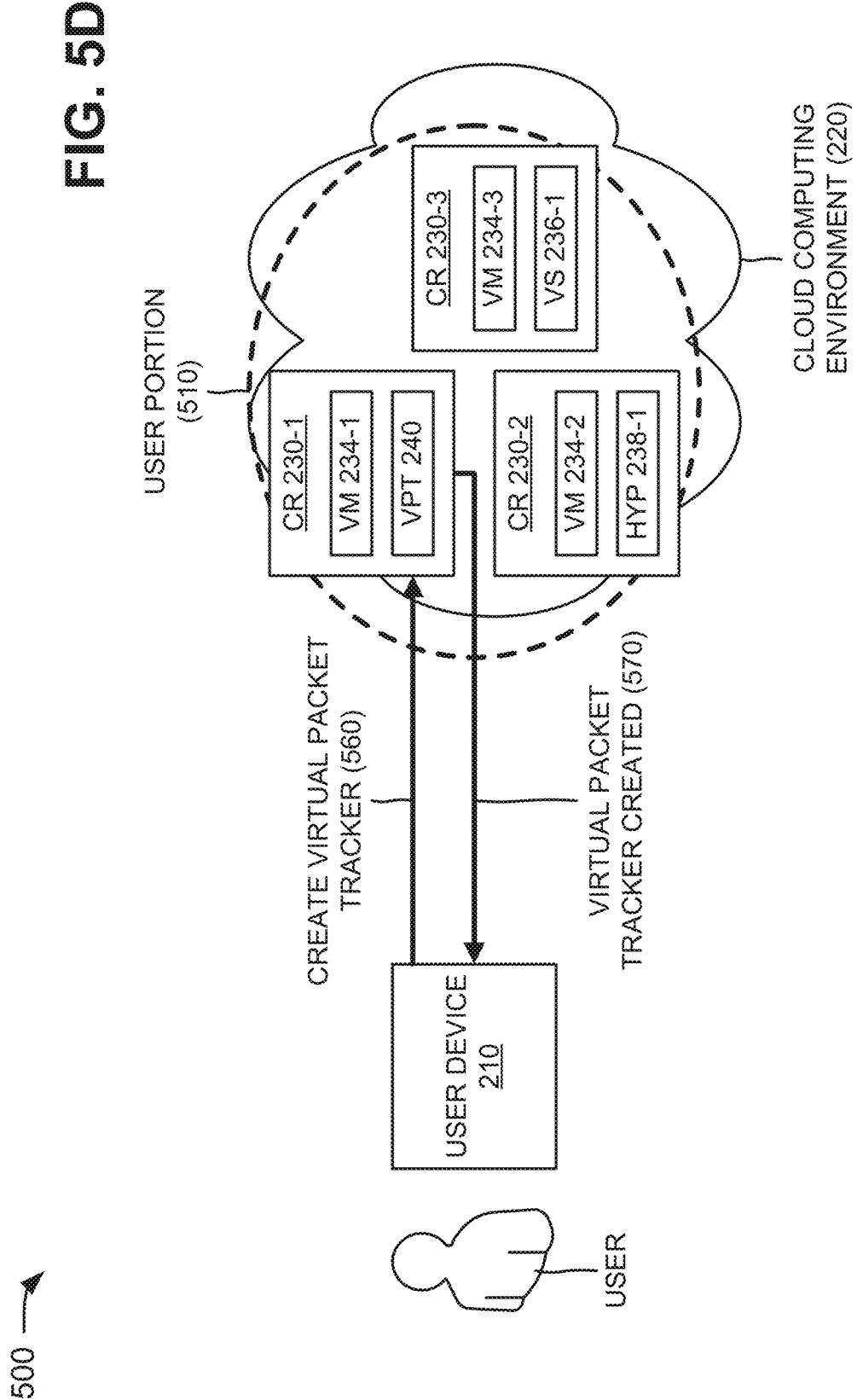

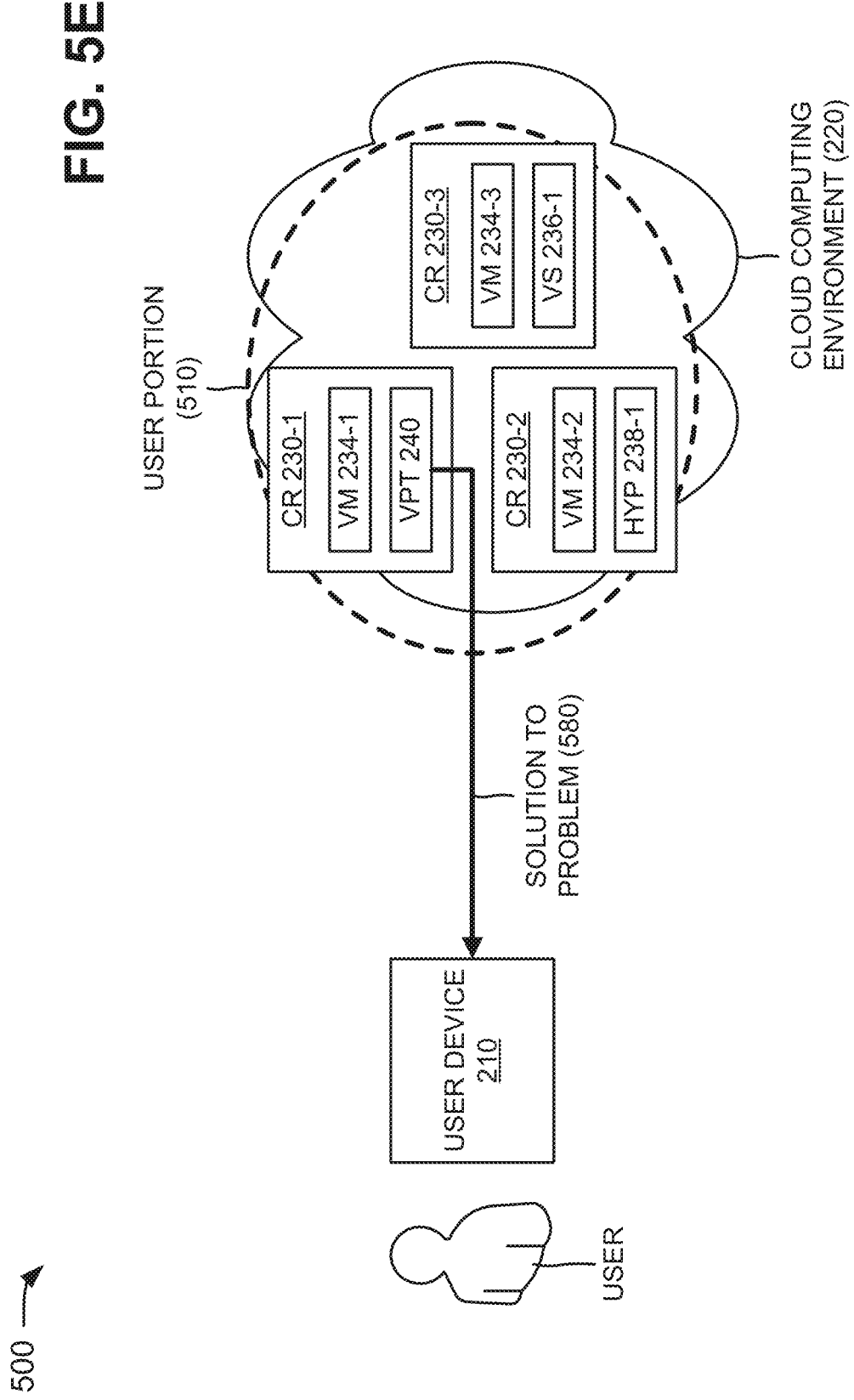

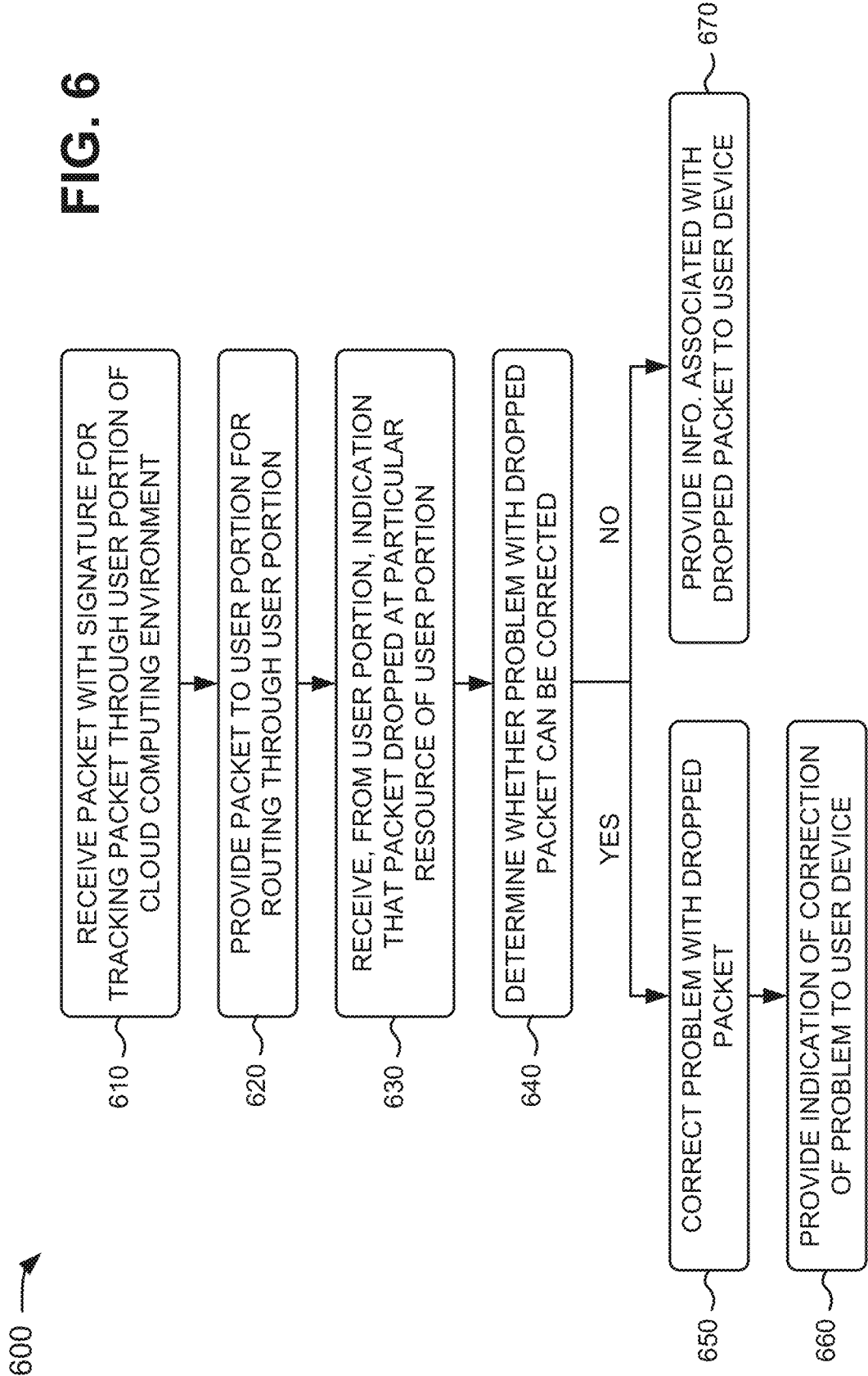

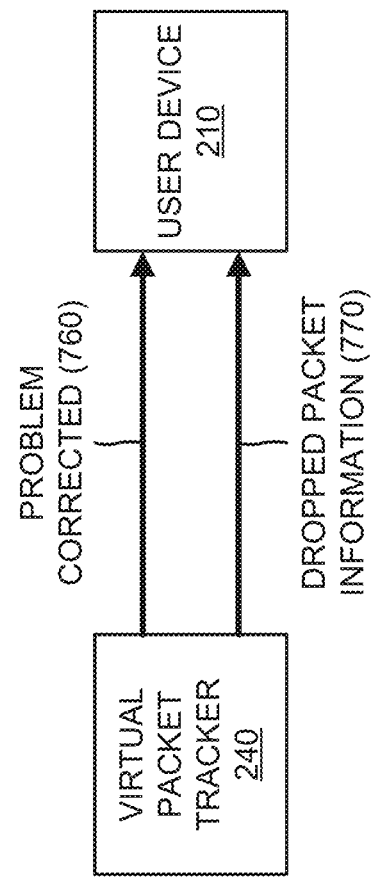

TRACKING PACKETS THROUGH A CLOUD COMPUTING ENVIRONMENT

BACKGROUND

Cloud computing is the use of computing resources (e.g., hardware, software, storage, computing power, etc.) which are available from a remote location and accessible over a network, such as the Internet. Cloud computing environments deliver the computing resources as a service rather than as a product, whereby shared computing resources are provided to user devices (e.g., computers, smart phones, etc.). Users may buy these computing resources and use the computing resources on an on-demand basis. Cloud computing environments provide services that do not require end-user knowledge of a physical location and configuration of a system that delivers the services.

The computing resources may include virtual machines (VMs) that provide software implementations of a machine and execute programs like a physical machine. The VMs may provide cloud computing services to the users. One or more users may create one or more VMs in the cloud computing environment. However, users may not properly configure the created VMs, and packets may be dropped in the cloud computing environment due to the improperly configured VMs. Such users may request that a provider of the cloud computing environment debug problems with the improperly configured VMs. This may unnecessarily strain resources available to the provider of the cloud computing environment.

BRIEF DESCRIPTION OF THE DRAWINGS

FIGS. 1A and 1B are diagrams of an overview of example implementations described herein;

FIG. 2 is a diagram of an example environment in which systems and/or methods described herein may be implemented;

FIG. 3 is a diagram of example components of one or more of the devices of the environment depicted in FIG. 2;

FIG. 4 is a flow chart of an example process for providing a virtual packet tracker in a cloud computing environment;

FIGS. 5A-5F are diagrams of an example of the process described in connection with FIG. 4;

FIG. 6 is a flow chart of an example process for utilizing a virtual packet tracker in a cloud computing environment; and FIGS. 7A-7D are diagrams of an example of the process described in connection with FIG. 6.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a virtual packet tracker that enables a user to debug problems associated with cloud resources (e.g., VMs, virtualized storage, hypervisors, etc.) allocated to the user in a cloud computing environment. When a problem occurs in the user's cloud resources, a user device may generate a packet, and may add a unique signature (e.g., a unique value associated with a packet payload) to the packet. The user device may provide the packet with the unique signature to the virtual packet tracker. The unique signature may enable the virtual packet tracker to track the packet through the user's cloud resources even when the packet's address is changed (e.g., by a load balancer or another device). This may enable the user to debug any problems associated with the user's cloud resources (e.g., an incorrect address of a cloud resource where the packet is dropped).

Figure 1A:
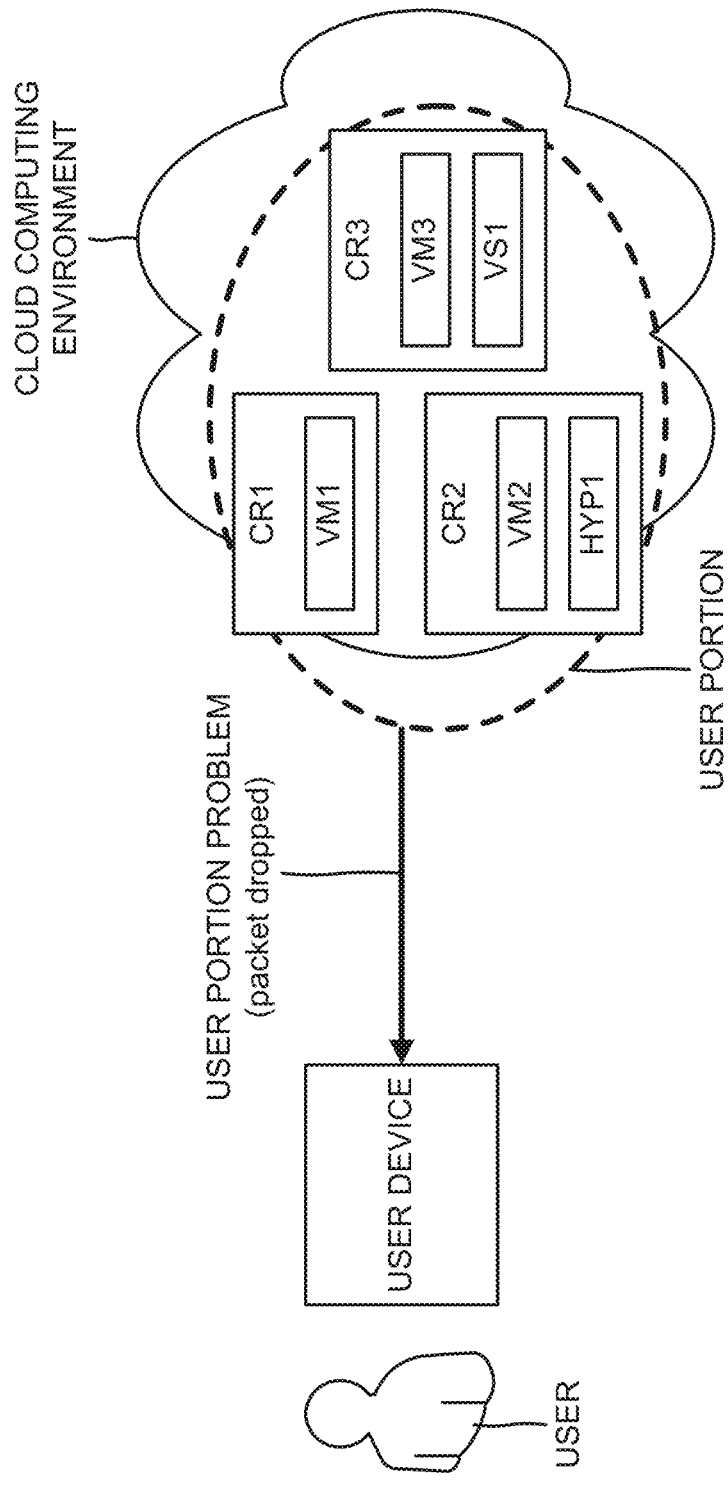

FIGS. 1A and 1B are diagrams of an overview of example implementations described herein. For the overview, assume that a cloud computing environment includes computing resources (CRs) that provide cloud resources (e.g., VMs, virtualized storage, hypervisors, etc.) for users of the cloud computing environment, as shown in FIG. 1A. Further assume that a user is allocated one or more computing resources of the cloud computing environment and that the allocated computing resources create a user portion of the cloud computing environment. For example, a first computing resource (CR1) may provide a VM (VM1) for a user device (e.g., a desktop computer, a tablet computer, etc.) associated with a user. A second computing resource (CR2) may provide a VM (VM2) and a hypervisor (HYP1) for the user device. A third computing resource (CR3) may provide a VM (VM3) and virtualized storage (VS1) for the user device.

The user may utilize the user device to interact with the user portion of the cloud computing environment. For example, assume that the user utilizes a database application provided by the user portion of the cloud computing environment. As further shown in FIG. 1A, the user may experience a problem during the user's interaction with the user portion of the cloud computing environment. For example, a packet may be dropped when the user is utilizing the database application provided by the user portion. The user device may receive an indication of the problem, and may display the indication to the user.

Based on the problem indication, the user may utilize the user device to instruct a computing resource of the user portion to create a virtual packet tracker (VPT), as shown in FIG. 1B. For example, the user device may instruct the first computing resource (CR1) to create a virtual packet tracker, and the first computing resource may create the virtual packet tracker based on the instruction. The user device may create a packet with a unique signature that may enable the virtual packet tracker to track the packet through the user portion even when an address of the packet is changed. The virtual packet tracker may receive the packet from the user device, and may route the packet through the computing resources and the cloud resources of the user portion.

Based on the routing of the packet, the virtual packet tracker may identify any problems associated with the user portion. For example, assume that the virtual packet tracker determines that the problem is that the packet is dropped at the third VM (VM3) provided in the third computing resource (CR3). As shown in FIG. 1B, the virtual packet tracker may provide an identification of the problem to the user device, and the user device may display the problem identification to the user. In some implementations, the virtual packet tracker may inspect the third VM to determine why the packet is dropped at the third VM. For example, assume that the virtual packet tracker determines that the packet is dropped because an address of the third VM is incorrectly configured. The virtual packet tracker, the first computing resource, the user device, or another device may be used to correctly configure the address of the third VM and correct the problem.

Such an arrangement may enable users to debug problems with cloud resources allocated to the users of a cloud computing environment. The provider of the cloud computing environment may not need to address the problems since the problems may be corrected by the users without the provider's intervention. The arrangement may also enable a packet to be tracked through the cloud computing environment even when an address of the packet is changed (e.g., by a load balancer or another device associated with the cloud computing environment).

FIG. 2 is a diagram of an example environment 200 in which systems and/or methods described herein may be implemented. As illustrated, environment 200 may include a user device 210 interconnected with a cloud computing environment 220 via a network 250. Components of environment 200 may interconnect via wired connections, wireless connections, or a combination of wired and wireless connections.

User device 210 may include one or more devices that are capable of communicating with cloud computing environment 220 via network 250. For example, user device 210 may include a laptop computer, a personal computer, a tablet computer, a desktop computer, a workstation computer, a smart phone, a personal digital assistant (PDA), and/or another computation or communication device. In some implementations, user device 210 may be associated with a user that receives services from cloud computing environment 220.

Cloud computing environment 220 may include an environment that delivers computing as a service, whereby shared resources, services, etc. may be provided to user device 210. Cloud computing environment 220 may provide computation, software, data access, storage, etc. services that do not require end-user (e.g., user device 210) knowledge of a physical location and configuration of system(s) and/or device(s) that deliver the services.

As shown, cloud computing environment 220 may include a group of computing resources 230 (referred to collectively as computing resources 230 and individually as computing resource 230). Computing resource 230 may include one or more personal computers, workstation computers, server devices, or other types of computation and communication devices. In some implementations, computing resource 230 may provide services to user device 210. The cloud resources may include compute instances executing in computing resource 230, storage devices provided in computing resource 230, data transfer operations executed by computing resource 230, etc. In some implementations, computing resource 230 may communicate with other computing resources 230 via wired connections, wireless connections, or a combination of wired and wireless connections.

As further shown in FIG. 2, computing resource 230 may include one or more applications (APPs) 232, one or more virtual machines (VMs) 234, virtualized storage (VS) 236, one or more hypervisors (HYPs) 238, a virtual packet tracker (VPT) 240, etc.

Application 232 may include one or more software applications that may be provided to or accessed by user device 210. Application 232 may eliminate a need to install and execute the software applications on user device 210. For example, application 232 may include word processing software, database software, monitoring software, financial software, communication software, and/or any other software capable of being provided via cloud computing environment 220. In some implementations, one application 232 may send/receive information to/from one or more other applications 232, via virtual machine 234.

Virtual machine 234 may include a software implementation of a machine (e.g., a computer) that executes programs like a physical machine. Virtual machine 234 may be either a system virtual machine or a process virtual machine, depending upon use and degree of correspondence to any real machine by virtual machine 234. A system virtual machine may provide a complete system platform that supports execution of a complete operating system (OS). A process virtual machine may execute a single program, and may support a single process. In some implementations, virtual machine 234 may execute on behalf of a user (e.g., user device 210), and may manage infrastructure of cloud computing environment 220, such as data management, synchronization, and long-duration data transfers.

Virtualized storage 236 may include one or more storage systems and/or one or more devices that use virtualization techniques to enable better functionality and more advanced features within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 238 may provide hardware virtualization techniques that allow multiple operating systems (e.g., "guest operating systems") to execute concurrently on a host computer, such as computing resource 230. Hypervisor 238 may present a virtual operating platform to the guest operating systems, and may manage the execution of the guest operating systems. Multiple instances of a variety of operating systems may share virtualized hardware resources. Hypervisor 238 may provide an interface to infrastructure as a service (IaaS) provided by cloud computing environment 220.

Virtual packet tracker 240 may include a component that enables a user to debug problems associated with cloud resources (e.g., VMs 234, virtualized storage 236, hypervisors 238, etc.) allocated to the user in cloud computing environment 220. When a problem occurs in the user's cloud resources, user device 210 may generate a packet, and may add a unique signature to the packet. User device 210 may provide the packet with the unique signature to virtual packet tracker 240. The unique signature may be provided at any location in the packet, and may include a value that is based on a payload or other data (e.g., content) of the packet. In some implementations, the unique signature may include a message-digest algorithm (MD5) value as specified in Request for Comments (RFC) 1321 by the Internet Engineering Task Force (IETF). The MD5 value may include a hash value that is generated based on the payload or other data of the packet. The unique signature may enable the packet to be tracked through the user's cloud resources even when the packet's address is changed (e.g., by a load balancer or another device). In some implementations, the unique signature may include a MD2 value, a MD3 value, a MD4 value, secure hash algorithm (SHA)-0 value, a SHA-1 value, a SHA-2 value, a SHA-3 value, etc.

Network 250 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

FIG. 3 is an example diagram of a device 300 that may correspond to one or more of the devices of environment 200. Each of the devices of environment 200 may include one or more devices 300 and/or one or more components of device 300. As illustrated, device 300 may include a bus 310, a processor 320, a main memory 330, a read-only memory (ROM) 340, a storage device 350, an input device 360, an output device 370, and/or a communication interface 380. Bus 310 may include a path that permits communication among the components of device 300.

Processor 320 may include one or more processors, microprocessors, application-specific integrated circuits (ASICs), field-programmable gate arrays (FPGAs), or other types of processing components that interpret and execute instructions. Main memory 330 may include one or more random access memories (RAMs) or other types of dynamic storage devices that store information and/or instructions for execution by processor 320. ROM 340 may include one or more ROM devices or other types of static storage devices that store static information and/or instructions for use by processor 320. Storage device 350 may include a magnetic and/or optical recording medium and its corresponding drive, or a removable memory, such as a flash drive.

Input device 360 may include a component that permits a user to input information to device 300. Output device 370 may include a component that outputs information to the user. Communication interface 380 may include any transceiver-like component that enables device 300 to communicate with other devices, networks, and/or systems. For example, communication interface 380 may include components for communicating with another device or system via a network.

As described herein, device 300 may perform certain operations in response to processor 320 executing software instructions contained in a computer-readable medium, such as main memory 330. A computer-readable medium may be defined as a non-transitory memory device. A memory device may include space within a single physical storage device or spread across multiple physical storage devices. The software instructions may be read into main memory 330 from another computer-readable medium, such as storage device 350, or from another device via communication interface 380. The software instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

FIG. 4 is a flow chart of an example process 400 for providing a virtual packet tracker in a cloud computing environment. In some implementations, process 400 may be performed by user device 210. In some implementations, process 400 may be performed by another device or a group of devices separate from or including user device 210.

As shown in FIG. 4, process 400 may include receiving an indication of a problem in a portion of a cloud computing environment associated with a user (block 410). For example, a user associated with user device 210 may be allocated a portion of cloud computing environment 220. The user may utilize the portion of cloud computing environment 220 to perform a number of tasks (e.g., to store information, execute software applications, etc.). In some implementations, the user may experience a problem when utilizing the portion of cloud computing environment 220 to perform tasks. For example, data may be lost when the user is attempting to store information in the portion of cloud computing environment 220. User device 210 may receive an indication of the problem, and may display the indication to the user. In some implementations, the indication may include information associated with the problem (e.g., "All of the information was not stored in your virtualized storage").

As further shown in FIG. 4, process 400 may include providing a request, to a computing resource of the cloud computing environment, for provisioning of a virtual packet tracker (block 420). For example, after receiving the indication of the problem, the user may utilize user device 210 to generate a request for provisioning of a virtual packet tracker in order to debug the problem. In some implementations, the user may generate the request instead of requesting a provider of cloud computing environment 220 to manually debug the problem. User device 210 may provide the request to a particular computing resource 230 provided in the portion of cloud computing environment 220 allocated to the user. In some implementations, user device 210 may provide the request to a particular computing resource 230 not provided in the portion of cloud computing environment 220 allocated to the user. The particular computing resource 230 may receive the request, and may create virtual packet tracker 240 in the particular computing resource 230 based on the request.

As shown in FIG. 4, process 400 may include receiving, from the computing resource of the cloud computing environment, an indication that the virtual packet tracker has been provisioned (block 430). For example, after the particular computing resource 230 creates virtual packet tracker 240, the particular computing resource 230 may generate an indication that virtual packet tracker 240 has been provisioned in the particular computing resource 230. The particular computing resource 230 may provide the indication to user device 210, and user device 210 may receive the indication.

As further shown in FIG. 4, process 400 may include utilizing the virtual packet tracker to troubleshoot the problem (block 440). For example, user device 210 may generate a packet with a unique signature (e.g., a MD2, MD3, MD4, MD5, SHA-0, SHA-1, SHA-2, SHA-3, etc. signature) that may enable virtual packet tracker 240 to track the packet through the portion of cloud computing environment 220 even when an address of the packet is changed. Virtual packet tracker 240 may route the packet through computing resources 230 and cloud resources (e.g., VMs 234, virtualized storage 236, hypervisors 238, etc.) of the portion of cloud computing environment 220.

Based on the routing of the packet, virtual packet tracker 240 may identify any problems associated with the portion of cloud computing environment 220. For example, virtual packet tracker 240 may determine that the packet is dropped at virtualized storage 236 of the portion of cloud computing environment 220 because virtualized storage 236 has an incorrect address. In some implementations, virtual packet tracker 240 may correct the identified problem (e.g., may correct the address of virtualized storage 236). In some implementations, virtual packet tracker 240 may provide information associated with the identified problem to user device 210, and user device 210 may display the information to the user. The user may utilize the information to correct the identified problem. In some implementations, virtual packet tracker 240 may be used to perform other functions that facilitate the debugging of problems in cloud computing environment 220.

In some implementations, when an address of a packet is changed in cloud computing environment 220 (e.g., by a load balancer), packet analyzers, such as packet sniffers, may be unable to track the packet through cloud computing environment 220. However, the packet generated by virtual packet tracker 240 may be tracked through cloud computing environment 220, via the unique signature, even when the packet address is changed.

As shown in FIG. 4, process 400 may include removing the virtual packet tracker from the computing resource of the cloud computing environment when the problem is corrected (block 450). For example, after the identified problem is corrected, either by the user or via virtual packet tracker 240, the user may utilize user device 210 to instruct the particular computing resource 230 to remove virtual packet tracker 240. The particular computing resource 230 may receive the instruction from user device 210, and may remove virtual packet tracker 240. Removal of virtual packet tracker 240 may conserve resources in the portion of cloud computing environment 220 and may save the user money.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Figure 5A:
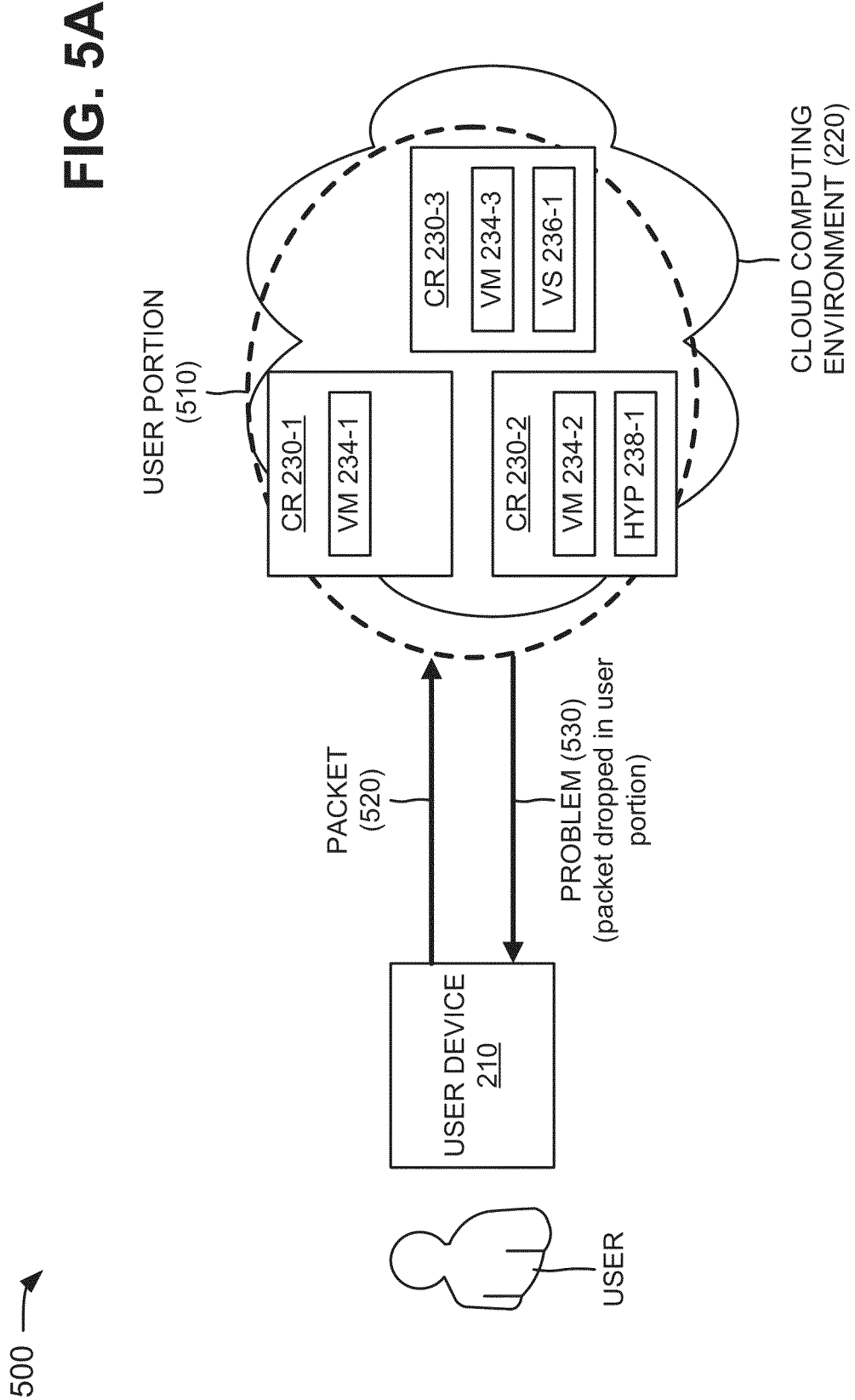

FIGS. 5A-5F are diagrams of an example 500 of the process described above with respect to FIG. 4. In example 500, assume that a user is allocated one or more computing resources 230 of cloud computing environment 220 and that the allocated computing resources 230 create a user portion 510 of cloud computing environment 220, as shown in FIG. 5A. For example, a first computing resource 230-1 may provide a first VM 234-1 for user device 210 associated with the user. A second computing resource 230-2 may provide a second VM 234-2 and a first hypervisor 238-1 for user device 210. A third computing resource 230-3 may provide a third VM 234-3 and a first virtualized storage 236-1 for user device 210.

In example 500, further assume that the user utilizes user device 210 to interact with user portion 510 of cloud computing environment 220. For example, the user may utilize a software application (e.g., an accounting application, a database application, etc.) provided by user portion 510 of cloud computing environment 220. The user may utilize user device 210 to provide information (e.g., a packet 520) to the software application provided by user portion 510. As further shown in FIG. 5A, the user may experience a problem 530 during the user's interaction with user portion 510 of cloud computing environment 220. For example, assume that packet 520 is dropped when the user is utilizing the software application provided by user portion 510. In some implementations, packet 520 may be dropped when a destination address of packet 520 is incorrect, when an address of a destination device of packet is incorrect, when user portion 510 is overloaded, etc. User device 210 may receive an indication of problem 530 from user portion 510, and may display the indication to the user. For example, user device 210 may display information indicating that packet 520 was dropped in user portion 510.

Figure 5B:
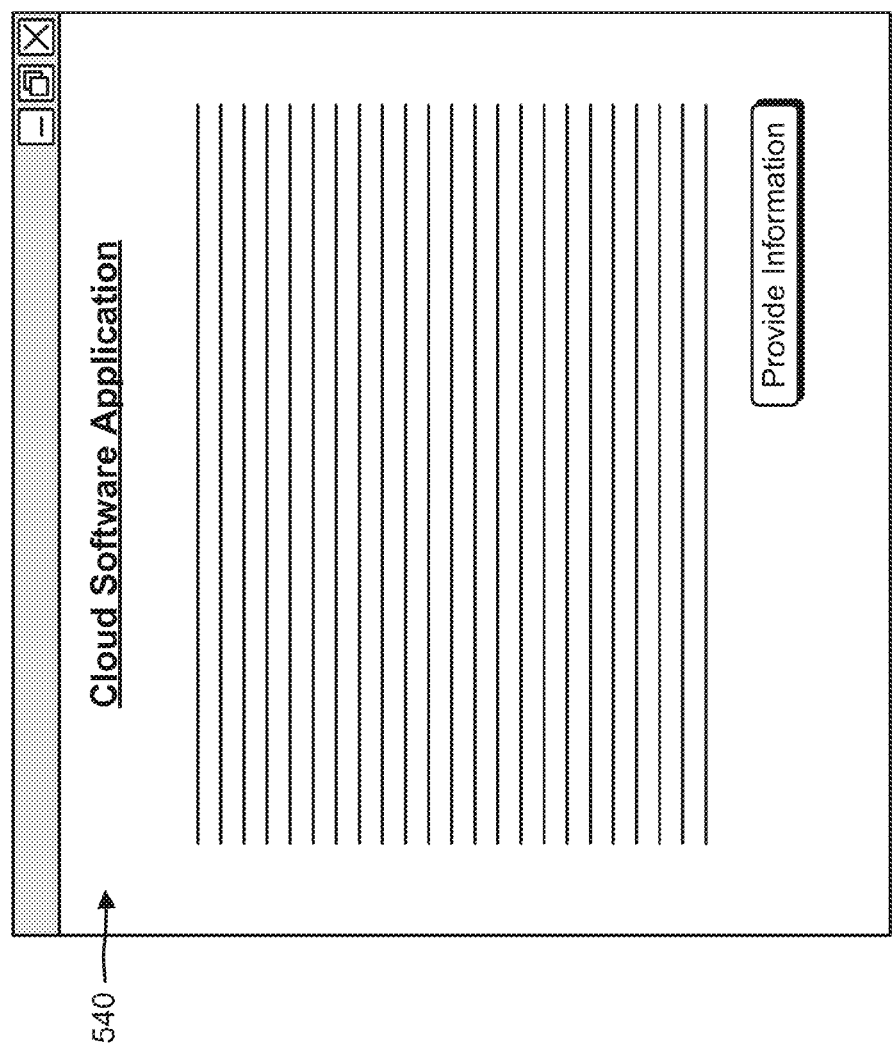
Figure 5C:
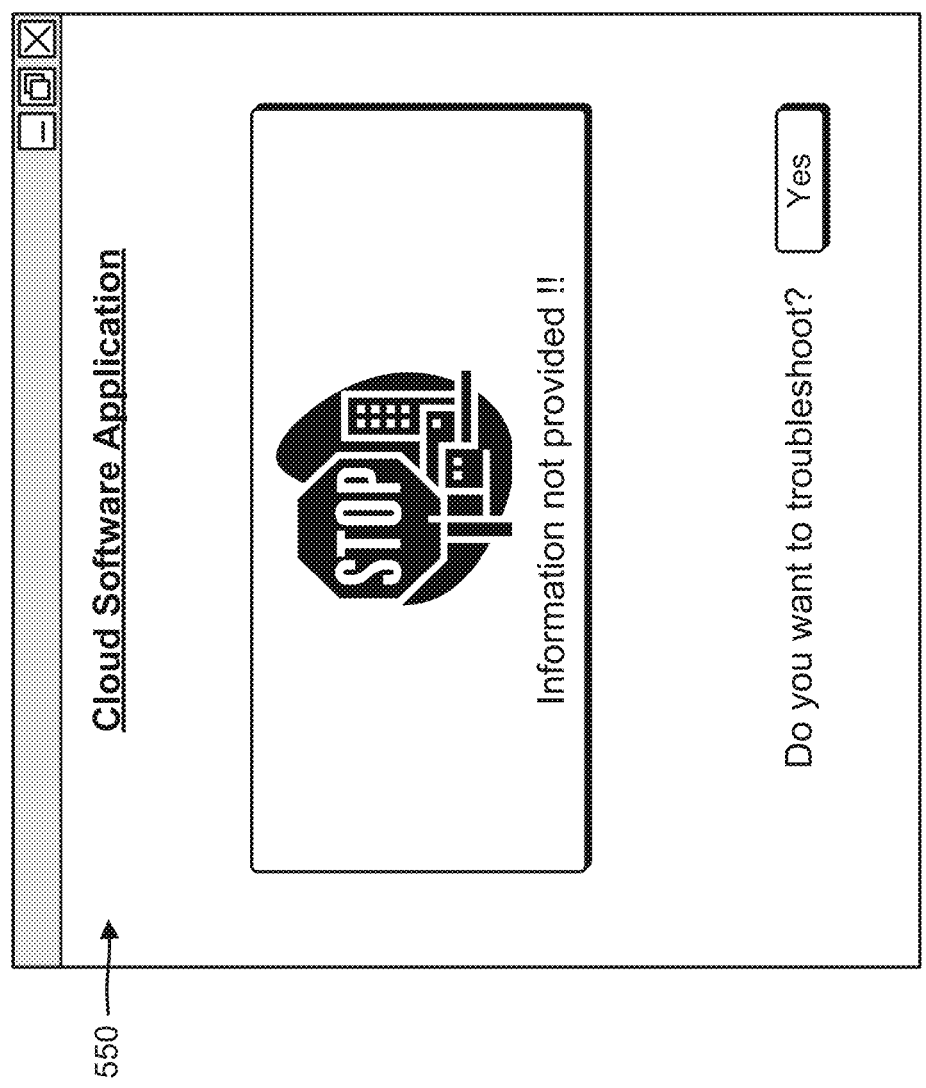

As shown in FIG. 5B, the software application of user portion 510 may provide a user interface 540 to user device 210 when the user is interacting with the software application. For example, user interface 540 may instruct the user to provide information to the software application. If the user elects to provide the information to the software application, packet 520 may be provided to user portion 510, as shown in FIG. 5A. However, because of problem 530, the information may not be provided to the software application. When this occurs, user device 210 may receive, from user portion 510, the indication of problem 530, and may display the indication via a user interface 550 as shown in FIG. 5C. For example, user interface 550 may indicate that the information was not provided to the software application, and may ask whether the user wants to troubleshoot problem 530.

If the user elects to troubleshoot problem 530, the user may utilize user device 210 to instruct a particular computing resource 230 to create virtual packet tracker 240, as indicated by reference number 560 in FIG. 5D. The particular computing resource 230 may receive the instruction from user device 210, and may create virtual packet tracker 240 based on the instruction. The particular computing resource 230 may provide, to user device 210, an indication 570 that virtual packet tracker 240 is created. User device 210 may generate a packet with a unique signature (e.g., a MD2, MD3, MD4, MD5, SHA-0, SHA-1, SHA-2, SHA-3, etc. signature) that may enable virtual packet tracker 240 to track the packet through user portion 510 even when an address of the packet is changed. Virtual packet tracker 240 may route the packet through computing resources 230 and cloud resources (e.g., VMs 234, virtualized storage 236, hypervisors 238, etc.) of user portion 510.

Figure 5F:
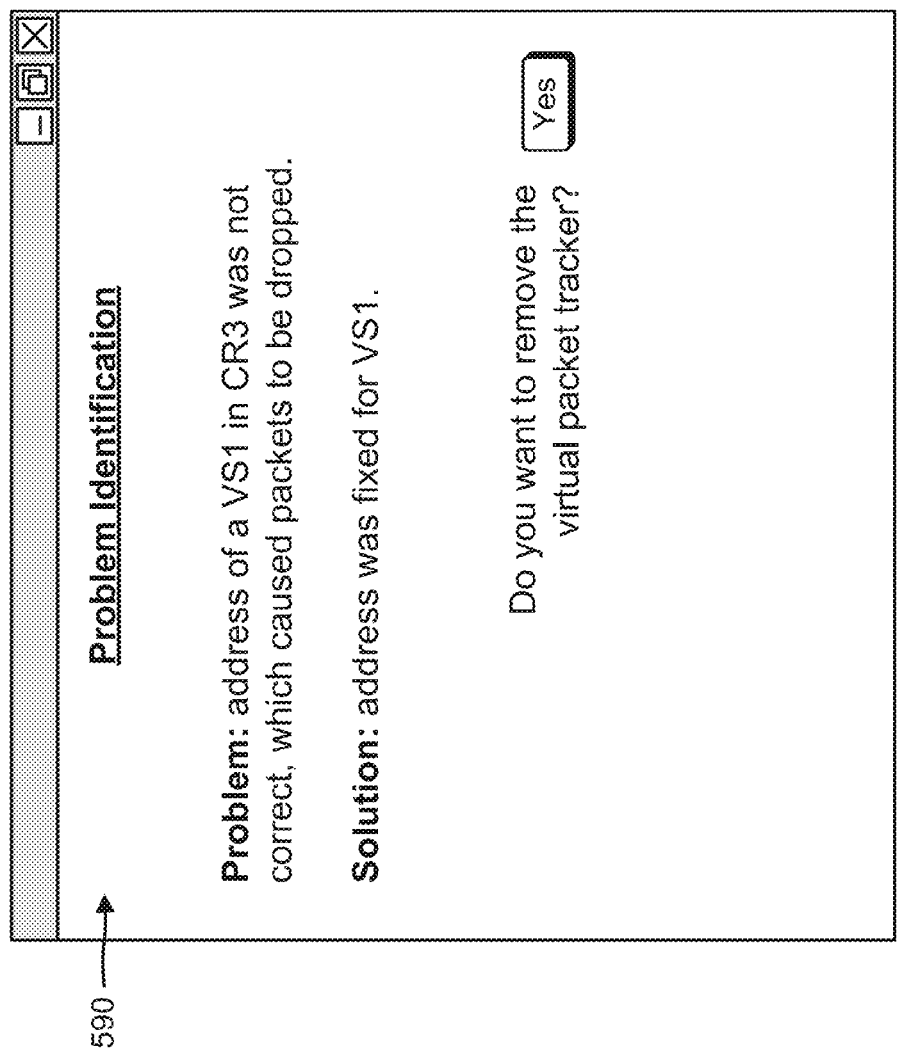

Based on the routing of the packet, virtual packet tracker 240 may identify any problems associated with user portion 510. For example, virtual packet tracker 240 may determine that the problem is that the packet is dropped at the first virtualized storage 236-1 because the first virtualized storage 236-1 has an incorrect address. Virtual packet tracker 240 may determine a solution 580 to the identified problem (e.g., may correct the address of the first virtualized storage 236-1), and may provide an indication of solution 580 to user device 210, as shown in FIG. 5E. For example, virtual packet tracker 240 may provide, to user device 210, a user interface 590 that provides information associated with solution 580, as shown in FIG. 5F. User interface 590 may provide information associated with problem 530 (e.g., "an address of a VS1 was not correct, which caused packets to be dropped") and solution 580 (e.g., "address was fixed for the VS1"). In some implementations, virtual packet tracker 240 may provide information associated with problem 530 to user device 210, and user device 210 may display the information to the user. The user may utilize the information to correct problem 530.

As further shown in FIG. 5F, user interface 590 may inquire whether the user wants to remove virtual packet tracker 240 from user portion 510. If the user elects to remove virtual packet tracker 240 from user portion 510, user device 210 may instruct the particular computing resource 230 to remove virtual packet tracker 240. The particular computing resource 230 may receive the instruction from user device 210, and may remove virtual packet tracker 240.

As indicated above, FIGS. 5A-5F are provided merely as an example. Other examples are possible and may differ from what was described with regard to FIGS. 5A-5F.

FIG. 6 is a flow chart of an example process 600 for utilizing a virtual packet tracker in a cloud computing environment. In some implementations, process 600 may be performed by computing resource 230. In some implementations, process 600 may be performed by another device or a group of devices separate from or including computing resource 230.

As shown in FIG. 6, process 600 may include receiving a packet with a signature for tracking the packet through a user portion of a cloud computing environment (block 610). For example, when a problem occurs in a portion of cloud computing environment 220 allocated to a user, the portion of cloud computing environment 220 may enable the user to troubleshoot the problem. The user, via user device 210, may instruct a particular computing resource 230 to create virtual packet tracker 240 in order to troubleshoot the problem. The particular computing resource 230 may receive the instruction from user device 210, and may create virtual packet tracker 240 based on the instruction. User device 210 may generate a packet with a unique signature that may enable virtual packet tracker 240 to track the packet through the portion of cloud computing environment 220 even when an address of the packet is changed. User device 210 may provide the packet with the unique signature to virtual packet tracker 240, and virtual packet tracker 240 may receive the packet.

As further shown in FIG. 6, process 600 may include providing the packet to the user portion for routing through the user portion (block 620). For example, virtual packet tracker 240 may provide the packet to the portion of cloud computing environment 220. The packet may be routed through computing resources 230 and cloud resources (e.g., VMs 234, virtualized storage 236, hypervisors 238, etc.) of the portion of cloud computing environment 220 in order to identify any problems associated with the portion of cloud computing environment 220. For example, the routing of the packet may identify that the packet is dropped at a particular computing resource 230 or cloud resource of the portion of cloud computing environment 220. The particular computing resource 230 or cloud resource may be identified when the packet is not received by the particular computing resource 230 or cloud resource. In some implementations, virtual packet tracker 240 may inspect the unique signature before the packet is received by a particular computing resource 230 and after the packet leaves the particular computing resource 230. For example, if the packet enters a load balancer with an IP address and leaves the load balancer with a different IP address, virtual packet tracker 240 may determine the changing of the IP address since the unique signature may not change as the packet travels through the load balancer.

As shown in FIG. 6, process 600 may include receiving, from the user portion, an indication that the packet is dropped at a particular resource of the user portion (block 630). For example, if the packet is not received by the particular computing resource 230 or cloud resource, the particular computing resource 230 or cloud resource may provide, to virtual packet tracker 240, an indication that the packet was not received. Virtual packet tracker 240 may receive the indication, and may determine that the packet is dropped at the particular computing resource 230 or cloud resource based on the indication.

As further shown in FIG. 6, process 600 may include determining whether a problem associated with the dropped packet can be corrected (block 640). For example, virtual packet tracker 240 may inspect the particular computing resource 230 or cloud resource to determine why the packet is dropped at the particular computing resource 230 or cloud resource. In some implementations, virtual packet tracker 240 may inspect configuration information (e.g., an address, parameters of devices available in the particular computing resource 230 or cloud resource, etc.) associated with the particular computing resource 230 or cloud resource to determine whether the configuration information is correct. If the configuration information is not correct and can be corrected, virtual packet tracker 240 may determine that the problem can be corrected. If the configuration information is correct or cannot be corrected, virtual packet tracker 240 may determine that the problem cannot be corrected.

As shown in FIG. 6, if the problem with the dropped packet can be corrected (block 640—YES), process 600 may include correcting the problem with the dropped packet (block 650). For example, if virtual packet tracker 240 determines that the problem can be corrected, virtual packet tracker 240 may correct the problem. In some implementations, if virtual packet tracker 240 determines that the address of the particular computing resource 230 or cloud resource is incorrect, virtual packet tracker 240 may correct the address of the particular computing resource 230 or cloud resource. In some implementations, if virtual packet tracker 240 determines that a parameter of a device available in the particular computing resource 230 or cloud resource is incorrect, virtual packet tracker 240 may correct the parameter.

As further shown in FIG. 6, if the problem with the dropped packet can be corrected (block 640—YES), process 600 may include providing an indication of correction of the problem to a user device (block 660). For example, if virtual packet tracker 240 corrects the problem with the dropped packet, virtual packet tracker 240 may provide, to user device 210, an indication of correction of the problem. In some implementations, virtual packet tracker 240 may provide, to user device 210, an indication that the address of the particular computing resource 230 or cloud resource has been corrected. In some implementations, virtual packet tracker 240 may provide, to user device 210, an indication that the parameter of the device available in the particular computing resource 230 or cloud resource has been corrected.

As shown in FIG. 6, if the problem with the dropped packet cannot be corrected (block 640—NO), process 600 may include providing information associated with the dropped packet to the user device (block 670). For example, if virtual packet tracker 240 determines that the problem packet cannot be corrected, or if the configuration information of the particular computing resource 230 or cloud resource is correct, virtual packet tracker 240 may provide information associated with the dropped packet to user device 210. The information associated with the dropped packet may include the configuration information of the particular computing resource 230 or cloud resource, header information of the packet, etc. User device 210 may display the information associated with the dropped packet to the user so that the user may attempt to correct the problem. In some implementations, virtual packet tracker 240 may provide the information associated with the dropped packet to another device of cloud computing environment for further analysis.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Figure 7A:
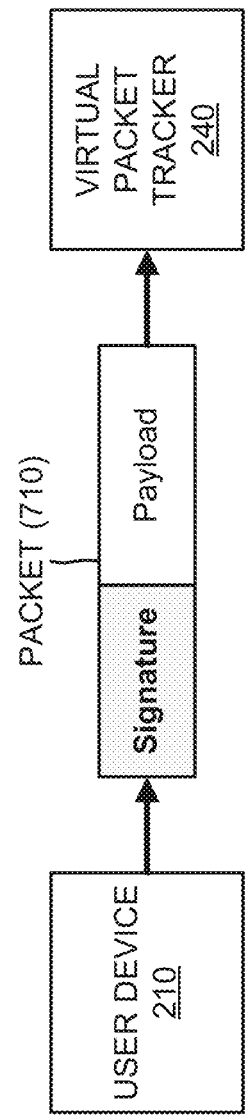

FIGS. 7A-7D are diagrams of an example 700 of the process described above with respect to FIG. 6. In example 700, assume that a user utilizes user device 210 to interact with a portion of cloud computing environment 220 allocated to the user. Further assume that the user experiences a problem during the interaction with the portion of cloud computing environment 220 and instructs, via user device 210, cloud computing environment 220 to create virtual packet tracker 240. After virtual packet tracker 240 is created, assume that user device 210 generates a packet 710 and provides packet to virtual packet tracker 240, as shown in FIG. 7A. As further shown in FIG. 7A, packet 710 may include a signature portion and a payload portion. The signature portion may be provided at any location in packet 710, and may include a value that is based on the payload portion or other data of packet 710. In some implementations, the signature portion may include a hash value (e.g., a MD2, MD3, MD4, MD5, SHA-0, SHA-1, SHA-2, SHA-3, etc. value) that is generated based on the payload portion or other data of packet 710. The signature portion may enable packet 710 to be tracked through the user's cloud resources even when an address of packet 710 is changed (e.g., by a load balancer or another device).

Figure 7B:
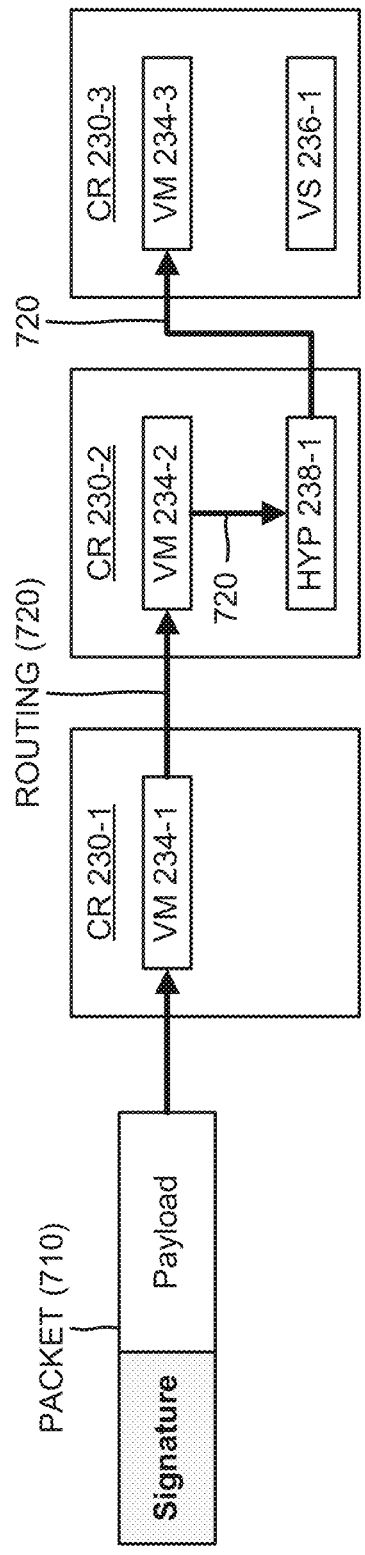

In example 700, further assume that virtual packet tracker 240 provides packet 710 to computing resources 230 and cloud resources of the portion of cloud computing environment 220, as shown in FIG. 7B. Assume that packet 710 includes addresses of computing resources 230 and the cloud resources provided in the portion of cloud computing environment 220. The addresses may enable packet 710 to be routed through computing resources 230 and cloud resources of the portion of cloud computing environment 220, as indicated by reference number 720 in FIG. 7B. For example, assume that packet 710 is routed to VM 234-1 of computing resource 230-1, and then to VM 234-2 of computing resource 230-2. Also assume that packet 710 is then routed to hypervisor 238-1 of computing resource 234-2, and then to VM 234-3 of computing resource 230-3. Further assume that packet 710 is dropped before being provided to virtualized storage 236-1 of computing resource 230-3.

Figure 7C:
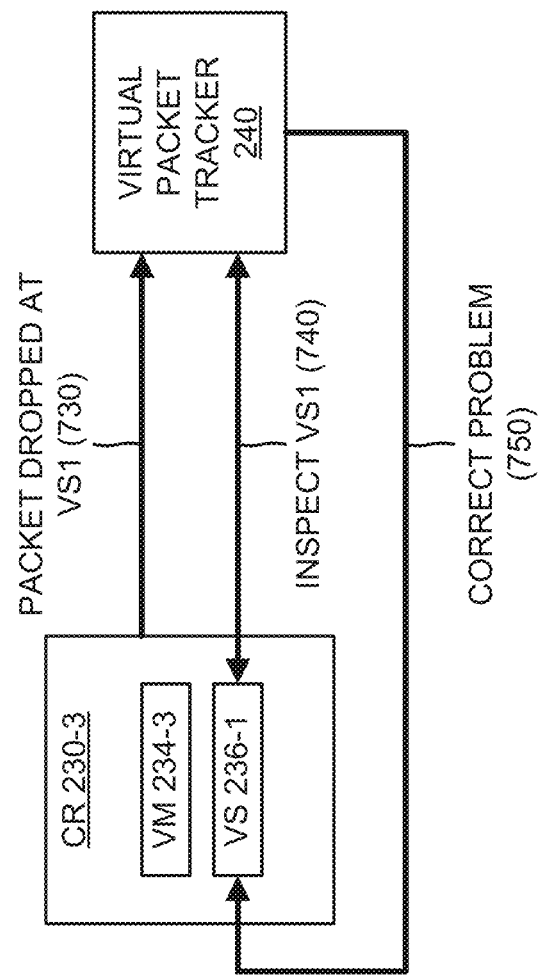

Since packet 710 is dropped at virtualized storage 236-1, computing resource 230-3 may provide, to virtual packet tracker 240, an indication 730 that packet 710 is dropped at virtualized storage 236-1, as shown in FIG. 7C. Virtual packet tracker 240 may receive indication 730, and may inspect configuration information associated with virtualized storage 236-1 based on indication 730, as indicated by reference number 740 in FIG. 7C. If virtual packet tracker 240 determines that the problem can be corrected based on the inspection, virtual packet tracker 240 may correct the problem, as indicated by reference number 750 in FIG. 7C. For example, assume that virtual packet tracker 240 determines that an address of virtualized storage 236-1 is incorrect (e.g., based on the configuration information), and that virtual packet tracker 240 corrects the address.

If virtual packet tracker 240 corrects the problem, virtual packet tracker 240 may provide, to user device 210, an indication 760 that the problem has been corrected, as shown in FIG. 7D. For example, assume that virtual packet tracker 240 provides, to user device 210, an indication that the address of virtualized storage 236-1 has been corrected. If virtual packet tracker 240 determines that the problem cannot be corrected based on the inspection, virtual packet tracker 240 may provide information 770 associated with packet 710 to user device 210, as further shown in FIG. 7D. Information 770 may include the configuration information of virtualized storage 236-1, header information of packet 710, etc. User device 210 may display information 770 to the user so that the user may attempt to correct the problem.

As indicated above, FIGS. 7A-7D are provided merely as an example. Other examples are possible and may differ from what was described with regard to FIGS. 7A-7D.

Systems and/or methods described herein may provide a virtual packet tracker that enables a user to debug problems associated with cloud resources allocated to the user in a cloud computing environment. When a problem occurs in the user's cloud resources, a user device may generate a packet, may add a unique signature to the packet, and may provide the packet to the virtual packet tracker. The unique signature may enable the packet to be tracked through the user's cloud resources even when the packet's address is changed. This may enable the user to debug any problems associated with the user's cloud resources.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

As used herein, the term "user" is intended to be broadly interpreted to include a user device, or a user of a user device.

User interfaces, as described herein, may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a user device (e.g., via a touch screen display, a mouse, a keyboard, a keypad, voice commands, etc.).

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
receiving, by a device and from a user device associated with a user, an instruction to create a virtual packet tracker,
the device being provided in a cloud computing environment;
creating, by the device, the virtual packet tracker in the device based on the instruction;
receiving, by the virtual packet tracker of the device, a packet that includes a signature,
the signature being used to track the packet in a portion of the cloud computing environment associated with the user;
providing, by the virtual packet tracker of the device, the packet to the portion of the cloud computing environment;
receiving, by the virtual packet tracker of the device, an indication that the packet is dropped at a particular resource of the portion of the cloud computing environment;
determining, by the virtual packet tracker of the device, whether a problem causing the packet to be dropped can be corrected by the virtual packet tracker of the device; and
performing, by the virtual packet tracker of the device, processing relating to the problem based on whether the problem can be corrected by the virtual packet tracker of the device,
the problem being corrected upon a determination that the problem can be corrected by the virtual packet tracker of the device, and
information associated with the packet being transmitted to the user device upon a determination that the problem cannot be corrected by the virtual packet tracker of the device.

2. The method of claim 1, where, upon the determination that the problem can be corrected by the virtual packet tracker of the device, the method further comprises:
providing, to the user device, an indication of correction of the problem after the problem is corrected by the virtual packet tracker of the device.

3. The method of claim 1, where the instruction to create the virtual packet tracker is received based on an issue occurring within the portion of the cloud computing environment associated with the user.

4. The method of claim 1, where, upon the determination that the problem can be corrected by the virtual packet tracker of the device, the method further comprises:
inspecting the particular resource to determine a cause of the problem; and
correcting the problem based on inspecting the particular resource.

5. The method of claim 1, where, upon the determination that the problem can be corrected by the virtual packet tracker of the device, the method further comprises:
removing the virtual packet tracker from the device after the problem is corrected.

6. The method of claim 1, where the signature of the packet includes a value that is based on content of the packet.

7. The method of claim 1, where, upon the determination that the problem cannot be corrected by the virtual packet tracker of the device, the transmitting of the information associated with the packet causes the user device to correct the problem.

8. A device of a cloud computing environment, the device comprising:
one or more processors to:
receive, from a user device associated with a user, an instruction to create a virtual packet tracker,
create the virtual packet tracker in the device based on the instruction,
receive, from the user device and by the virtual packet tracker, a packet that includes a unique value,
the unique value being used to track the packet in a portion of the cloud computing environment associated with the user,
provide, by the virtual packet tracker, the packet for routing through the portion of the cloud computing environment,
receive, by the virtual packet tracker, an indication that the packet is dropped at a particular resource of the portion of the cloud computing environment,
determine, by the virtual packet tracker, whether a problem causing the packet to be dropped can be corrected by the virtual packet tracker, and
perform, by the virtual packet tracker, processing relating to the problem based on whether the problem can be corrected by the virtual packet tracker,
the problem being corrected upon a determination that the problem can be corrected by the virtual packet tracker, and
information associated with the packet being transmitted to the user device upon a determination that the problem cannot be corrected by the virtual packet tracker.

9. The device of claim 8, where, upon the determination that the problem can be corrected by the virtual packet tracker, the one or more processors are further to:
provide, to the user device, an indication of correction of the problem after the problem is corrected.

10. The device of claim 8, where the instruction to create the virtual packet tracker is received based on an issue occurring within the portion of the cloud computing environment associated with the user.

11. The device of claim 8, where, upon the determination that the problem can be corrected by the virtual packet tracker, the one or more processors are further to:
inspect the particular resource to determine a cause of the problem, and
correct the problem based on the cause of the problem.

12. The device of claim 8, where, upon the determination that the problem can be corrected by the virtual packet tracker, the one or more processors are further to:
remove the virtual packet tracker from the device after the problem is corrected.

13. The device of claim 8, where the unique value of the packet includes a hash value that is based on content of the packet.

14. The device of claim 8, where, upon the determination that the problem cannot be corrected by the virtual packet tracker, the transmitting of the information associated with the packet causes the user device to correct the problem.

15. A non-transitory computer-readable medium for storing instructions, the instructions comprising:
one or more instructions that, when executed by one or more processors of one or more devices of a cloud computing environment, cause the one or more processors to:
receive, from a user device associated with a user, an instruction to create a virtual packet tracker, implement, in the one or more devices and based on the instruction, the virtual packet tracker to:
receive, from the user device, a packet that includes a unique value,
the unique value being used to track the packet in a portion of the cloud computing environment associated with the user,
provide the packet for routing through the portion of the cloud computing environment,
receive an indication that the packet is dropped at a particular resource of the portion of the cloud computing environment,
determine whether a problem causing the packet to be dropped can be corrected by the virtual packet tracker, and
perform processing relating to the problem based on whether the problem can be corrected by the virtual packet tracker,
the problem being corrected upon a determination that the problem can be corrected by the virtual packet tracker, and
information associated with the packet being transmitted to the user device upon a determination that the problem cannot be corrected by the virtual packet tracker.

16. The non-transitory computer-readable medium of claim 15, where the instruction to create the virtual packet tracker is received based on an issue occurring within the portion of the cloud computing environment associated with the user.

17. The non-transitory computer-readable medium of claim 15, where, upon the determination that the problem can be corrected by the virtual packet tracker, the instructions further comprise:
one or more instructions that, when executed by the one or more processors, cause the one or more processors to:
inspect the particular resource to determine a cause of the problem, and
correct the problem based on determining the cause of the problem.

18. The non-transitory computer-readable medium of claim 15, where, upon the determination that the problem can be corrected by the virtual packet tracker, the instructions further comprise:
one or more instructions that, when executed by the one or more processors, cause the one or more processors to:
remove the virtual packet tracker from the device after the problem is corrected.

19. The non-transitory computer-readable medium of claim 15, where the unique value of the packet includes a hash value that is based on content of the packet.

20. The non-transitory computer-readable medium of claim 15, where upon the determination that the problem cannot be corrected by the virtual packet tracker, the transmitting of the information associated with the packet causes the user device to correct the problem.

* * * * *